United States Patent [19]

Logan

[11] Patent Number: 4,553,310
[45] Date of Patent: Nov. 19, 1985

[54] INTEGRALLY FORMED SIDEPOCKET MANDREL

[75] Inventor: Francis D. Logan, Houston, Tex.

[73] Assignee: Camco, Incorporated, Houston, Tex.

[21] Appl. No.: 584,048

[22] Filed: Feb. 27, 1984

[51] Int. Cl.$^4$ .............................................. B23P 11/00
[52] U.S. Cl. .................................... 29/517; 166/117.5
[58] Field of Search ....................... 29/517; 166/117.5; 29/510, 511

[56] References Cited

U.S. PATENT DOCUMENTS

| | | | |
|---|---|---|---|
| Re. 29,870 | 12/1978 | Moore, Jr. et al. | 166/117.5 |
| 2,828,537 | 4/1958 | Pischke et al. | 29/517 |
| 3,741,299 | 6/1973 | Terral | 166/117.5 |
| 4,333,527 | 6/1982 | Higgins et al. | 166/117.5 |
| 4,416,330 | 11/1983 | Merritt et al. | 166/117.5 |

Primary Examiner—Howard N. Goldberg
Assistant Examiner—Leonard S. Selman
Attorney, Agent, or Firm—Fulbright & Jaworski

[57] ABSTRACT

A method of forming one end of a sidepocket mandrel into a tubular shape having an internal diameter large enough to receive an orienting sleeve, moving an orienting sleeve through the formed end, securing the sleeve to the mandrel, and reforming said end for reducing the internal diameter of the end sufficiently to form a premium female thread therein. The method of making an integrally formed sidepocket mandrel having a one-piece body with a main bore and an offset bore. Both ends are formed into tubular shapes while leaving a middle section unworked whereby the middle section forms a main bore and an offset bore. The tubular ends are reduced in size and shaped to form thickened walls which are aligned at the opposite ends of the main bore. During forming, one end, such as the bottom, is formed approximately sized for receiving thread, and the other end, preferably the top, is formed with an internal diameter sized to pass an orienting sleeve. After securing an orienting sleeve in the main bore, the top end is then reformed to reduce its internal diameter to approximately the internal diameter of the orienting sleeve and to provide material to cut an internal premium thread.

22 Claims, 12 Drawing Figures

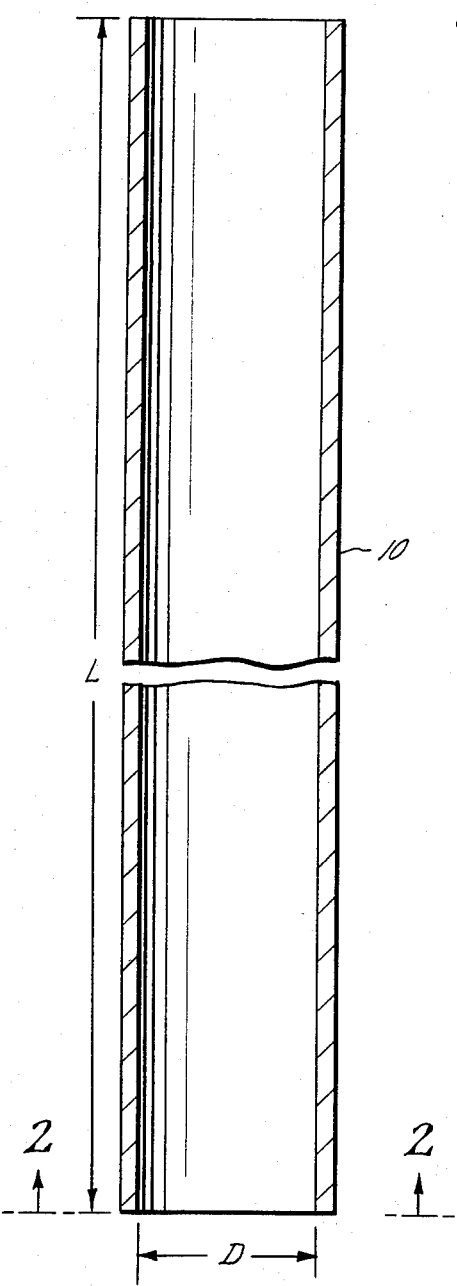
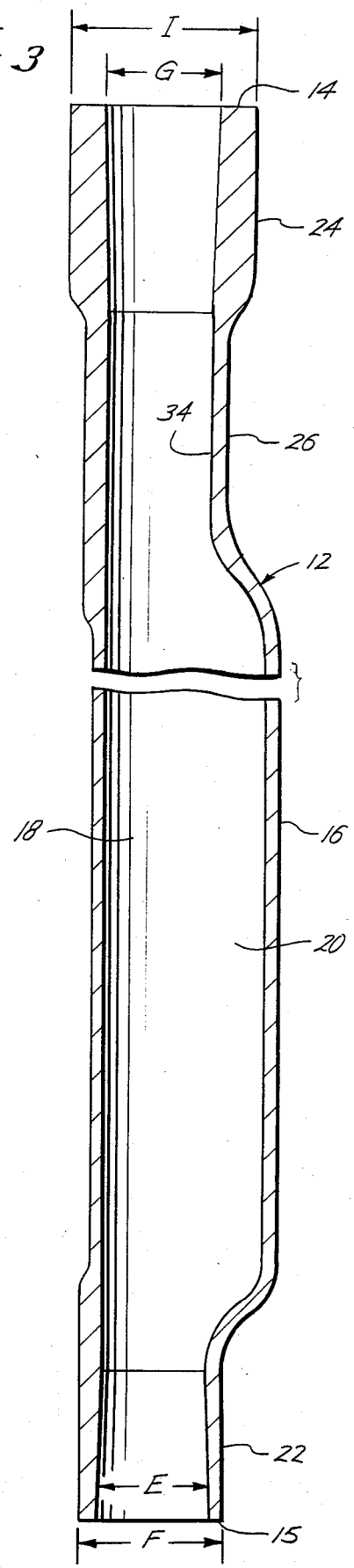
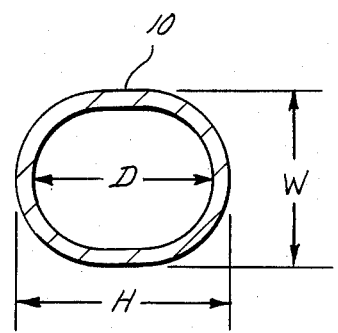

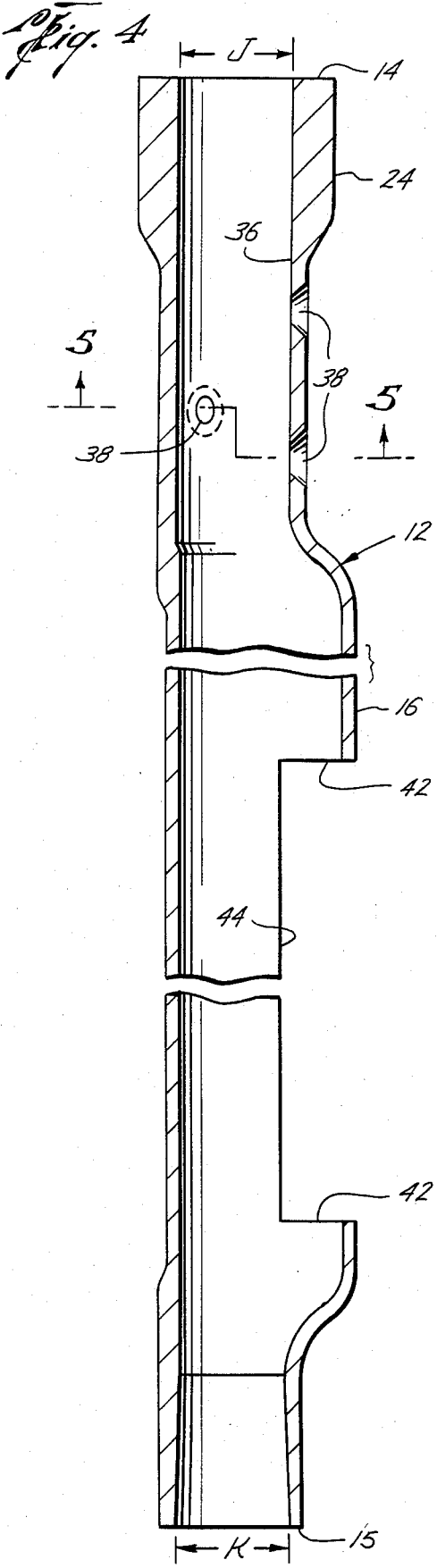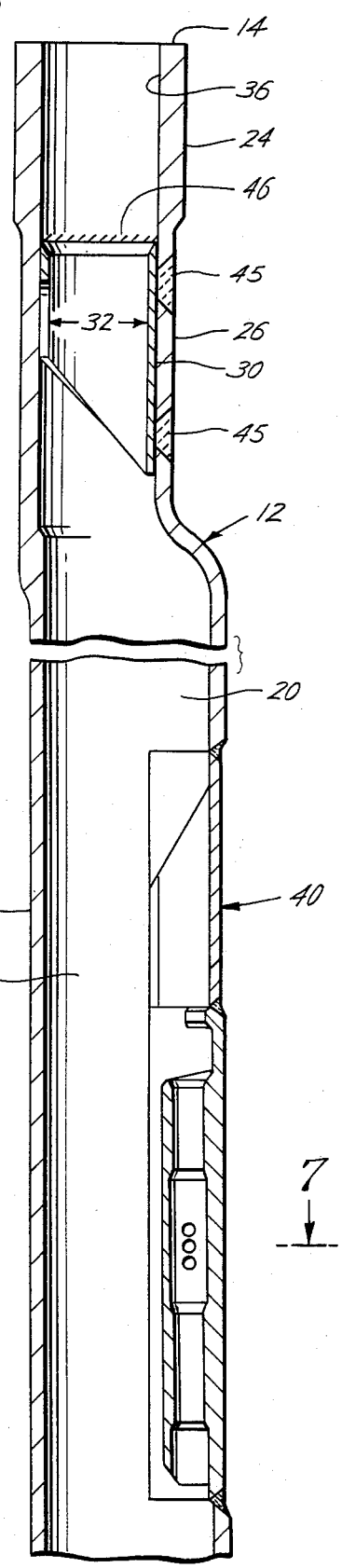

INTEGRALLY FORMED SIDEPOCKET MANDREL

BACKGROUND OF THE INVENTION

It is well known to utilize sidepocket mandrels in oil and/or gas wells in which the mandrel has a main bore which is aligned with the production tubing string and also includes an offset bore having a pocket for receiving various types of flow control devices which can be used for various functions such as controlling other equipment or controlling the flow of fluid between the interior and the exterior of the mandrel. As indicated in U.S. Pat. No. 4,333,527, many different types of construction has been utilized in order to increase the strength of the sidepocket mandrels and make the mandrels less subject to failure. However, many mandrels include an orienting sleeve which is positioned in the main bore for guiding and actuating a kickover tool for inserting and removing flow control devices from the sidepocket. It is important that the internal diameter of the orienting sleeve be as great as the internal diameter of the main bore in order not to restrict the passage of well tools through the main bore of a tubing string. The mandrels are threadably connected at each end to the tubing string by threads. So long as the threads are standard types such as EUE, an orienting sleeve may pass through a female thread and be secured into the main bore. However, many of the threads are of the premium type such as sold or licensed by Vam, Mannesmann, or Hydril. These premium threads have a smaller internal diameter and consequently a conventional orienting sleeve cannot be passed through these threads. Therefore it is customary as indicated in U.S. Pat. No. Re. 29,870 and U.S. Pat. No. 4,416,330 to secure the mandrel ends by circumferential welds or by threads to the main mandrel body. That is, generally the ends are formed separately by swaging to provide the necessary thickness for the premium threads, and the orienting sleeve may be inserted into a swage end opposite the thread blanks and secured therein and thereafter the swage may be connected to the main mandrel body, generally by circumferential weld.

However, it is desirable to reduce the number and extent of welds in a mandrel to reduce the possibility of failure. The present invention is directed to a method of forming one end of a mandrel into a tubular shape having an internal diameter large enough to receive an orienting sleeve through the formed end securing the sleeve in the mandrel and reforming the end to a smaller internal diameter to form a premium thread. The present invention is also directed to an integrally forged mandrel having a body and ends made in one piece without any circumferential welds or joints thereby increasing the structure integrity of the mandrel and reducing its exposure to failure.

SUMMARY OF THE INVENTION

The present invention is directed to a method for forming and shaping one end of a mandrel through which an orienting sleeve may move and then reform the end to accept a premium thread. Another object is to provide a method of making an integrally formed sidepocket mandrel having a one-piece body with a main bore and an offset bore which does not require circumferential welds or joining of parts of the body which would provide points of possible failure. In one embodiment the mandrel is without any welds extending through the walls.

It is a further object to provide an integrally formed sidepocket mandrel having thread blanks at each end which will accommodate all types of threads such as standard or premium threads thereby providing lower costs by having a single manufacturing process and inventory which can be used to satisfy any type of threads required for a particular application.

Yet a further object is the method of making an integrally formed sidepocket mandrel by forming and shaping both ends of the stock by reducing the size of the ends and forming a tubular shape while leaving a middle section unworked whereby the middle section forms a main bore and an offset bore. Preferably, the ends being formed are reduced in size and shaped to form thickened walls and are aligned with each other and with the main bore. An orienting sleeve is moved into the main bore through one of the ends and secured in the main bore spaced from the ends. The end of the mandrel through which the sleeve is moved is reformed to reduce its internal diameter. Possibly after reforming, the inside of the one end is machined internally to a size through which the sleeve can move. In addition, the outside of the end may be machined to provide concentric inner and outer diameters.

Still a further object of the present invention is wherein during the forming step, the top end of the stock is formed with a larger internal diameter than the bottom end of the stock with the internal diameter of the top end being sized for receiving the orienting sleeve and the bottom end being approximately sized for receiving threads. After reforming, both ends are bored for providing a straight and concentric internal diameter for later receiving threads.

The method further comprehends heating a one-piece tubular metal stock, forging and upsetting both ends of the stock while leaving a middle section unworked to form a main bore and an offset bore. The ends being forged are reduced in size and made circular, and upset to form thickened walls. During the forging and upsetting, the bottom end is formed of a size for receiving threads, but the top end is formed with an internal diameter approximately sized to pass an orienting sleeve. An orienting sleeve is moved into the main bore through the top and secured in the main bore but spaced from the top end. The mandrel is reheated and the top end is reforged to reduce the internal diameter of the top end to substantially the size for receiving threads. Preferably during the reheating and reforming, the internal diameter of the top end is reduced to approximately the internal diameter of the orienting sleeve. Also preferably, after forging and upsetting, the upper and lower ends are machined externally and internally to be concentric.

A further object of the present invention is that during the forging and upsetting step, the upper end is upset to provide an external diameter shoulder greater than the diameter of the stock or neck adjacent the upper end, the orienting sleeve is secured in the main bore beyond the formed greater external diameter and into the neck, and during the reheating and reforging, the greater external diameter shoulder is squeezed inwardly to be approximately equal in external diameter to the external diameter of the adjacent stock or neck.

Still a further object is wherein the mandrel stock is a one-piece tubular metal stock having a discriminator, locking shoulder and offset pocket formed therein without any welds extending through the stock.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is an elevational view, in cross section, of one type of stock material from which the sidepocket mandrel can be formed, FIG. 2 is a cross-sectional view taken along the line 2—2 of FIG. 1, FIG. 3 is a fragmentary elevational view, in cross-section, of the stock of FIG. 1 after it has been initially formed and shaped, FIG. 4 is a fragmentary elevational view of the mandrel of FIG. 3 which has been machined at the ends and cut as desired to provide one suitable type of pocket in the offset bore, FIG. 6 is a fragmentary elevational view, in cross-section, of an orienting sleeve secured in the main bore of the mandrel, and one suitable type of pocket, discriminator and latch shoulder secured therein.

DESCRIPTION OF THE PREFERRED EMBODIMENT

Figure 10:
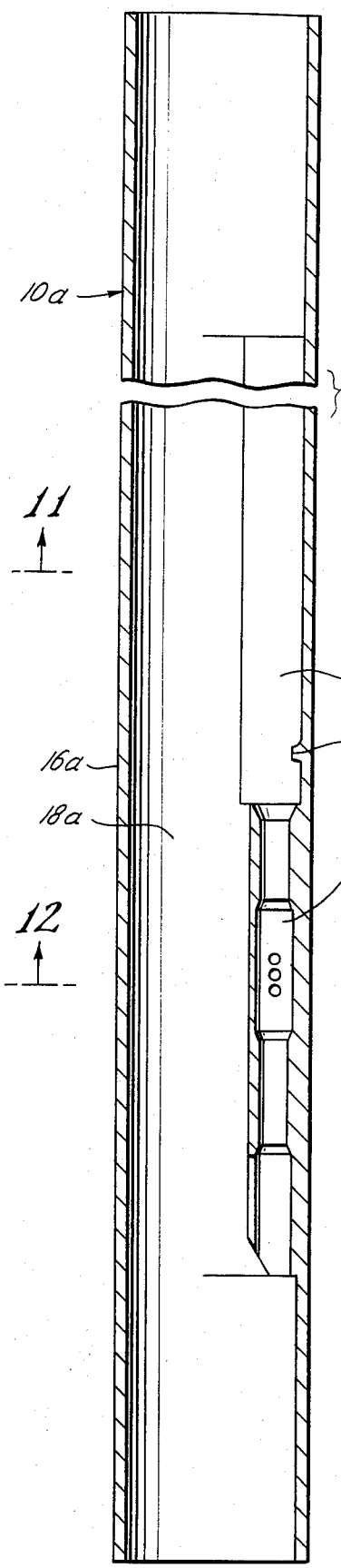
FIG. 10 is an elevational view, in cross-section, of another form of stock material in which the pocket, latch shoulder and discriminator are preformed therein.

Referring now to the drawings, the manufacture of a mandrel with premium threads and an orienting sleeve and an integrally formed mandrel will be described. For purposes of illustrating the method and the sizing of various portions of the mandrel, typical dimensions will be described in connection with the manufacture of a 3½" size typical mandrel.

Referring now to FIGS. 1 and 2, any suitable type of stock may be utilized such as round or oval extrusions, here shown as an oval extrusion 10 as it is generally preferable for mandrels to be oval shaped in cross-section for side-by-side positioning in well casings. One typical size stock would be a width W of 4", a height H of 5.25", an overall length L of 90" and its greater internal diameter "D" of 4.375".

In the first step, the one-piece tubular metal stock 10 is formed and shaped, such as being heated, forged and upset by conventional dies to a shape generally indicated by the reference numeral 12 in FIG. 3. However, the forming and shaping can be preformed by conventional machines that shape metal in an unheated condition. It is to be noted that the top end 14 and the lower end 15 during forming or forging are made circular to provide a tubular shape, reduced in size and upset, but the middle section 16 is left unworked whereby the middle section forms a main bore 18 which is later aligned with, connected to, and forms a continuation of the bore in a production string. The middle section 16 also includes an offset bore 20 which is or will be provided with a sidepocket for receiving a flow control device, as will be more fully described hereinafter.

The bottom end 15 is formed inwardly and reduced in size and tubularly configured and the wall 22 around the lower end 15 may be thickened for later receiving threads. Preferably, the lower end 15 is forged inwardly to be approximately equal in size for receiving threads. For example, the circular end 15 in a 3½" mandrel has an internal diameter E at the end 15 of approximately 2.812" and an outer diameter F at the end 15 of approximately 4.250". The dimension E is approximately equal to the diameter of the main bore 18. The end 15 can receive either a male or a female thread. In most cases this bottom end will receive a male thread which has a maximum outside diameter of 3.750 inches.

The top end 14 is similarly formed and shaped, such as upset and forged to provide a substantially tubular wall 24 and is thickened to provide at the end 14 an external diameter shoulder 24 which is greater than the diameter of the neck 26 of the stock which is adjacent to shoulder 24. However, an orienting sleeve 30 (FIG. 6) must be included in the mandrel for orienting a kickover tool and placing a flow control device in the sidepocket as more fully described in U.S. Pat. No. Re. 29,870 and the interior diameter 32 of the orienting sleeve 30 should be equal to the diameter of the main bore 18 so as not to interfere with the passage of well tools through the well tubing. However, it is frequently desirable to provide so-called premium type threads in the interior of the ends 14 and 15 such as sold or licensed by VAM, Mannesmann, or Hydril. With the interior of the ends 14 and 15 sized for receiving premium threads, the orienting sleeve 30 is too big in its outer diameter to be inserted into the end of a mandrel. Therefore, it is the customary practice to make the end 14 separate from the middle section 16 of the mandrel 12 and secure the swaged end 14 onto the middle section 16 by threads or welds as shown in U.S. Pat. No. 29,870 and U.S. Pat. Nos. 4,333,527 and 4,416,330. However, this requires one or more circumferential welds joining the end 14 to the middle section 16.

The present invention is directed to avoiding the use of circumferential welds or threaded connections by making the mandrel an integrally formed one-piece body. Therefore, in the forming or forging step shown in FIG. 3, the internal diameter G is not reduced sufficiently to provide a blank for forming premium threads, but the shoulder 24 is made circularly shaped and with the diameter G, for example, approximately 3.375", so as to be approximately sized to pass an orienting sleeve 30. The diameter I at the top end 14 is approximately 4.750". The forging operation inherently produces internal surfaces in the ends 14 and 15 which taper outwardly at a slight angle towards the end. It is further to be noted that while the length L of the raw stock 10 in FIG. 1 was 90" long, the length of the raw forged mandrel 12 in FIG. 3 is reduced to approximately 80.500" caused by upsetting the top end 14 and the bottom end 15 to form the thickened wall surfaces 24 and 22, respectively.

While it has been indicated in connection with FIG. 3 that the lower end 15 is forged inwardly to approximately its threading diameter and the upper end 14 is forged inwardly to a size for admitting the passage of an orienting sleeve 30, a top end 14 could be forged in to the approximate threaded blank internal diameter while the bottom end 15 was forged downwardly to a size for admitting the orienting sleeve. While this would not be as satisfactory as previously described in the event that the orienting sleeve 30 was to be positioned adjacent the upper end, as shown in FIG. 6, it would be satisfactory in the event that the orienting sleeve 30 was positioned at some other location in the main bore 18 such as adjacent the lower end 15.

Figure 5:
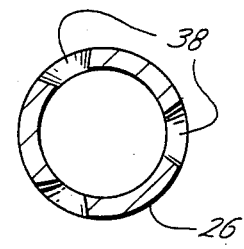
FIG. 5 is a cross-sectional view taken along the line 5—5 of FIG. 4.

If the foregoing operation performed in FIG. 3 on the mandrel 12 is sufficiently accurate and fine enough along the internal surface 34, the orienting sleeve may be secured internally in the mandrel 12 in the step of FIG. 6, which will be more fully described hereinafter. However, as best seen in FIG. 4, it is usually desirable to machine the interior of the ends 14 and 15 to provide a more accurate mating surface for receiving the orienting sleeve 30 and for aligning the interiors of the ends 14 and 15. Thus, referring to FIG. 4, the interior diameters of the ends are machined for providing accurate cylindrical surfaces. Thus, the diameter J of the top end 14 may be machined to approximately 3.400" and the internal diameter K of the bottom end 15 may be machined to an internal diameter of 2.880". In addition, if desired, the outer surface of the external shoulder 24 may also be machined sufficient to ensure that it is concentric with the internal diameter 36. The orienting sleeve 30 may be secured in the inside of the mandrel body 12 by various procedures. One procedure is the use of plug welds and if this procedure is to used, openings 38 (FIGS. 4 and 5) may be machined in the neck 26 during the machining operation. Also, there are various ways that a sidepocket generally indicated by the reference numeral 40 (FIG. 6) may be inserted into the offset bore 20. One way is to machine a rectangular window such as by transverse cuts 42 and longitudinal cuts 44 into the middle section 16 for inserting an insert 40 into the opening. If so, the machine cuts may be made during the step as shown in FIG. 4, as is conventional.

Referring now to FIG. 6, the next step is to insert the orienting sleeve 30 through the upper end 14 and secure it in place in the neck 26. As previously indicated, the orienting sleeve 30 may be secured in place by plug welds 45 through the openings 38. However, the amount of welding through the walls of the mandrel 12 may be reduced by omitting the plug welds 45 and instead using an internal weld 46 between the interior of the mandrel 12 and the top of the orienting sleeve 30 as is also conventional. It is also noted that the sidepocket insert 40 may be installed into the window created by the cuts 42 and 44, by several small longitudinal and transverse welds along the cuts 42 and 44. A further description of a suitable sidepocket insert having a discriminator, ock and pocket is shown in U.S. Pat. No. 3,741,299. While the use of the insert 40 will create welds through the wall of the mandrel 12 to some extent, the use of the insert 40 is a cost effective way of placing a discriminator, lock and sidepocket in a mandrel. However, if desired, as will be more fully discussed hereinafter, the sidepocket insert may be provided in middle section 16 without welds.

Figure 8:
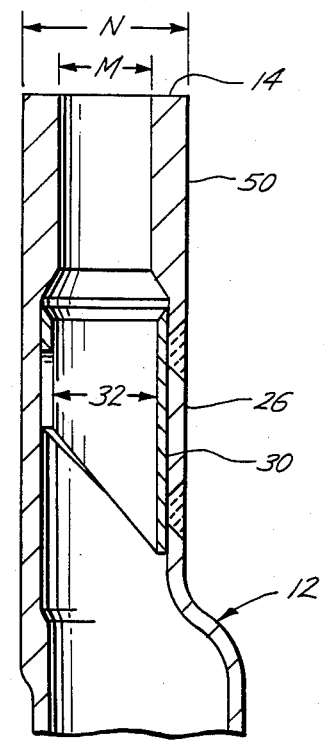
FIG. 8 is a fragmentary elevational view, in cross-section, of the upper end of the mandrel which has been reformed to reduce its internal diameter to provide a premium thread.

Referring now to FIG. 8, the top end 14 of the mandrel 12 is reformed such as reheated and reforged by roll forging or any conventional forging, and the enlarged external diameter shoulder 24 (FIG. 6) is squeezed inwardly whereby the new shoulder 50 is approximately equal in diameter to the neck 26 and the internal diameter M is approximately equal to the internal diameter 32 of the orienting sleeve 30. For example, the outer diameter N may be 4.280" and the internal diameter M may be 2.820".

Both ends 14 and 15 may suitably be bored to provide an internal diameter M of 2.900" and the walls of the ends 14 and 15 are sized to receive either standard threads or premium threads, male or female. In addition, the outer diameters at both ends 14 and 15 as generally turned to 4.155" for space limitations in a well casing. The mandrel 12 without the threads may now be placed in inventory. When it is desired to thread the mandrels 12, suitable threads 52 may be provided at each end 14 and 15 and the threads 52 may be either standard or premium type threads. Therefore, the present mandrel 12 may be made in a single manufacturing process and stored in a single inventory with the consequent economy of operation.

Figure 11:
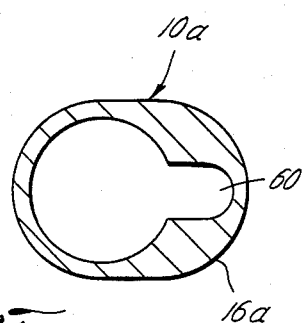
FIG. 11 is a cross-sectional view taken along line 11—11 of FIG. 10.
Figure 12:
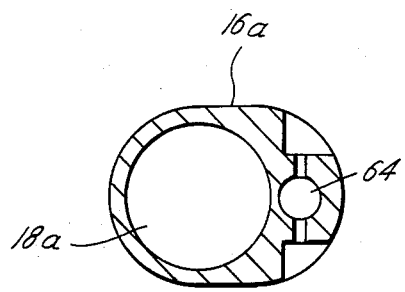
FIG. 12 is a cross-sectional view taken along line 12—12 of FIG. 10.
Figure 7:
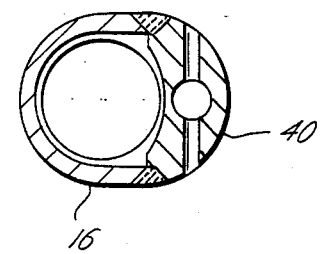
FIG. 7 is cross-sectional view taken along the line 7—7 of FIG. 6.
Figure 9:
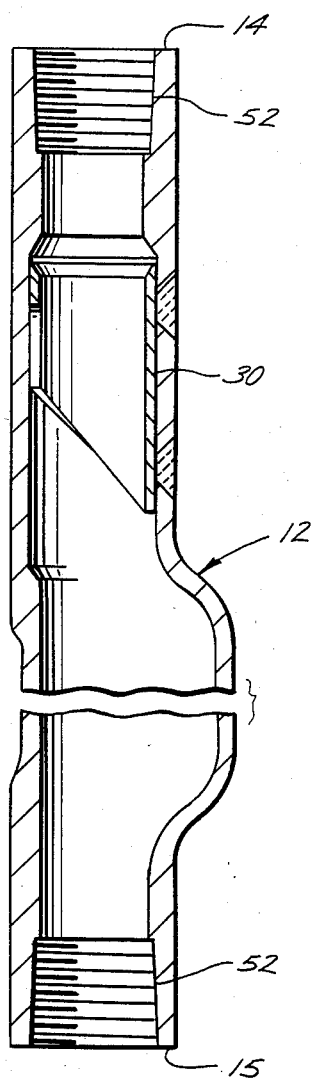
FIG. 9 is a fragmentary elevational view in cross-section, of the finished mandrel with threads.

Referring now to FIGS. 10, 11 and 12 as has previously been discussed, if desired, a more expensive mandrel can be provided having no welds through the side wall.

Referring now to FIG. 10, a stock 10a is shown in which bar stock is machined or otherwise formed to provide in a middle section 16a, a discriminator 60, lock shoulder 62 and sidepocket 64 which are integral in a stock 10a. The stock 10a can be used as the starting stock instead of stock 10 as previously described to provide a weldless mandrel. That is, there is no need to weld a sidepocket insert 40 therein and the weld 46 of FIG. 6 may be used instead of plug welds 45. Otherwise, the method of manufacturing as shown and described in FIGS. 3-9 may be used to convert the stock 10a into an integral forged mandrel.

The present invention, therefore, is well adapted to carry out the objects and attains the ends and advantages mentioned as well as others inherent therein. While the presently preferred embodiments of the invention are given for the purpose of disclosure, numerous changes in the details of construction, arrangement of parts, and steps of the process may be made which will readily suggest themselves to those skilled in the art and which are encompassed within the spirit of the invention and the scope of the appended claims.

What is claimed is:

1. The method of making an integral metal sidepocket mandrel having a one-piece body having a main bore and an offset bore and ends and a metal orienting sleeve without requiring the ends to be made separately and circumferentially welded comprising, forming and shaping both ends of a one-piece tubular metal stock by reducing the ends while leaving a middle section unreduced whereby the middle section forms a main bore and an offset bore, said ends being formed into tubular shapes and being aligned with and forming part of the main bore, at least one of the ends having an internal diameter large enough to receive an orienting sleeve, moving an orienting sleeve into the main bore through one of the ends and securing said sleeve in the main bore spaced from one of the ends, and reforming said one end for reducing the internal diameter of said one end to a diameter less than the outside diameter of the sleeve for providing material to form a premium thread thereon.

2. The method of claim 1 including, at the time of forming said one end of the mandrel into a tubular shape, shaping said one end to thicken the wall of the tubular shaped end.

3. The method of claim 1 wherein, after forming, the inside of the tubular shaped end is machined internally.

4. The method of claim 3 wherein, the outside of the tubular shaped end is machined externally to be concentric with the machined internal diameter.

5. The method of claim 1 wherein, said end is a part of a one-piece metal stock having a discriminator, locking shoulder and offset pocket formed therein without any welds extending through the stock.

6. The method of claim 1 wherein, during reforming the internal diameter of said end is reduced to approximately the internal diameter of the orienting sleeve.

7. The method of making an integral sidepocket mandrel having a one-piece body having a main bore and an offset bore comprising,
heating a one-piece tubular metal stock forge,
forming and shaping both ends of the stock reducing the ends while leaving a middle section unworked whereby the middle section forms a main bore and an offset bore, said ends being formed into tubular shapes, reduced in size and shaped to form thickened walls and being aligned to form a main bore,
moving an orienting sleeve into the main bore through one of the ends and securing said sleeve in the main bore spaced from the end,
reforming the end through which the sleeve is moved to reduce the internal diameter of said end.

8. The method of claim 7 wherein, during reforming, the internal diameter of said end is reduced to approximately the internal diameter of the orienting sleeve.

9. The method of claim 7 wherein, after forming and shaping, the inside of said one end is machined internally to a size to move the sleeve therein.

10. The method of claim 7 wherein, after forming and shaping, the inside and the outside of said ends are machined to provide concentric inner and outer diameters.

11. The method of claim 7 wherein, during the forming and shaping step, the top end of the stock is forged with a larger internal diameter than the bottom end of the stock for receiving the orienting sleeve.

12. The method of claim 7 wherein, after reforming, the ends are bored for providing a straight and concentric internal diameters for later receiving threads.

13. The method of making an integrally forged sidepocket mandrel having a one-piece body having a main bore, an offset bore, and an orienting sleeve in the main bore comprising,
heating a one-piece tubular metal stock,
forging and upsetting both ends of the stock while leaving a middle section unworked whereby the middle section forms a main bore and an offset bore, said ends being forged in a tubular shape, reduced in size, and upset to form thickened walls and being aligned at opposite ends of the main bore,
during said forging and upsetting, the bottom end is approximately sized for receiving threads, but the top end is formed with an internal diameter approximately sized to pass an orienting sleeve,
moving an orienting sleeve into the main bore through the top end and securing said sleeve in the main bore spaced from the top end,
reheating and reforging the top end to reduce the internal diameter of the top end for providing material to cut a premium thread.

14. The method of claim 3 wherein after forging and upsetting the upper end is machined internally to a size to move the sleeve therein.

15. The method of claim 14 wherein, after forging and upsetting the upper end is machined externally to be concentric with the machined internal diameter.

16. The method of claim 13 wherein, during the reheating and reforging the internal diameter of the top end is reduced to approximately the internal diameter of the orienting sleeve.

17. The method of claim 13 wherein, during the forging and upsetting, the upper end is upset to provide an external diameter greater than the diameter of the stock adjacent the upper end.

18. The method of claim 17 wherein, the orienting sleeve is secured in the main bore beyond the formed greater external diameter.

19. The method of claim 13, after reheating and forging the internal and external diameters of the opposite ends are machined to substantially the same size.

20. The method of claim 13 wherein, the thickness of the material at each end is sufficient to cut an internal standard or premium thread.

21. The method of claim 18 wherein, during the reheating and reforging the greater external diameter is squeezed inwardly to be approximately equal in external diameter to the external diameter of the stock adjacent the greater external diameter.

22. The method of claim 13 wherein, said end is a part of a one-piece tubular metal stock having a discriminator, locking shoulder and offset pocket formed therein without any welds extending through the stock.

* * * * *